DATA COMPARATOR

Filed March 29, 1954 8 Sheets-Sheet 1

INVENTOR.
Julius Jancin Jr.

*INVENTOR.*

Julius Jancin Jr.

INVENTOR.
Julius Jancin Jr.

April 11, 1961 J. JANCIN, JR 2,979,257

DATA COMPARATOR

Filed March 29, 1954 8 Sheets-Sheet 4

INVENTOR.

Julius Jancin Jr.

DATA COMPARATOR

Filed March 29, 1954 8 Sheets-Sheet 5

INVENTOR.

*Julius Jancin Jr.*

INVENTOR.
Julius Jancin Jr.

April 11, 1961 J. JANCIN, JR 2,979,257

DATA COMPARATOR

Filed March 29, 1954 8 Sheets-Sheet 7

INVENTOR.

Julius Jancin Jr.

INVENTOR.
Julius Jancin Jr.

United States Patent Office 2,979,257

Patented Apr. 11, 1961

2,979,257

DATA COMPARATOR

Julius Jancin, Jr., Binghamton, N.Y., assignor to International Business Machines Corporation, New York, N.Y., a corporation of New York Filed Mar. 29, 1954, Ser. No. 419,420

7 Claims. (Cl. 235—61.7)

This invention relates to data comparing devices in general.

Heretofore, as is stated in copending U.S. patent application Serial No. 419,475, filed on March 29, 1954, various mechanical, electro-mechanical and electronic data comparators have been devised for use to compare one expression of information with another expression of information. Very often, such comparators also provide means to determine the relative magnitude of one expression with respect to the other. As a general rule, the comparing positions wherein the data being analyzed are manifested, are connected in tandem, and the data positions are effective for compare purposes one by one as each of the comparing positions is analyzed successively. In addition, the relative magnitude of one expression of information with respect to the other expression of information is determined by, and corresponds with, the relative magnitude of the orders of data in the first unmatched, or unequal, comparing position.

Figure 5A:
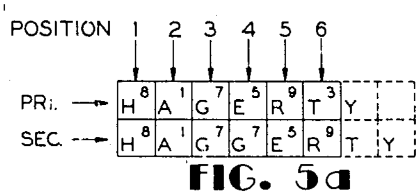
Figure 5B:
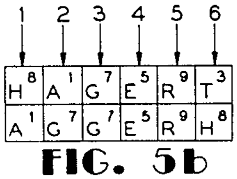
Figure 6A:
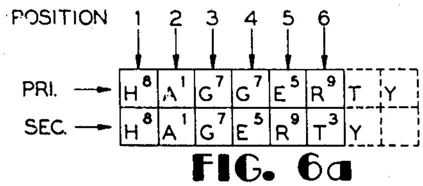
Figure 6B:
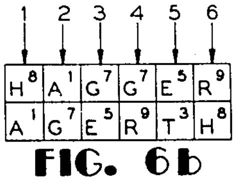
Figure 6C:
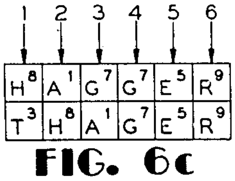

Many times it is expedient and efficient to pass as matched, or equal expressions of information, those unmatched expressions which bear a predetermined degree of resemblance to one another. Such differences, for example, may be a cross-compare error as is shown in position 4 of Fig. 3, a transposition-of-orders error as is shown in positions 3 and 4 of Fig. 4*a*; a "right-offset" error such as is shown in Fig. 5*a*, i.e., one in which the orders of data of one expression are offset to the right with respect to the other expression; and a "left-offset" error such as is shown in Fig. 6*a*, i.e., one in which the orders of data of one expression are offset to the left with respect to the other expression. Certainly, many persons may spell a name, or the like, according to its phonetic sound, e.g., Allan instead of Allen, and many persons may transpose data unknowingly, e.g., 54239 instead of 54329. It is a generally accepted fact that errors of the afore-mentioned kind occur very frequently, and it is for this reason that these errors are quite often termed "human errors."

To amplify the foregoing paragraph, it is assumed, for example, that a record card collating operation is being performed on a machine such as the well-known Type 077 or Type 089 IBM Collator. Normally, as is well known to persons familiar with this art, record cards are detected as being unmatched whenever there is any difference whatsoever between orders of data in any comparing position. As a general rule, if the difference of data is due to one of the afore-mentioned so-called human errors, the record card detected as being unmatched and selected for rejection during the collating operation, is subsequently hand-filed in its proper place. In most cases such a record is not corrected because it will not be used again for collating purposes. Thus, it is clear that if record cards having an error of the afore-mentioned type, are permitted to pass as matched cards, the aforesaid hand-filing operation will not be necessary. The avoidance of such hand-filling operations, it has been determined, will save many tens of thousands of dollars per annum.

It is both desirable and necessary to point out, however, that the present invention provides an improvement in data comparators whereby not all expressions of information falling within the afore-mentioned "human errors" categories, are passed as so-called matched expressions. For instance, a left-offset error of the type shown in Fig. 6*a*, wherein a character is omitted from the secondary expression, will not always be caused to pass as a matched expression. This will be explained more in detail hereinafter under the heading "left-offset." It must be remembered, however, that heretofore all left-offset error expressions, for example, were detected as unmatched expressions. Hence, the improvement afforded by this invention lies in the fact that a substantially great number of problem which hitherto required human hand-filing operations to correct, are eliminated.

Accordingly, an object of this invention is to provide a data comparing device which is capable of detecting a variety of errors and adaptable to solve problems which hitherto required human labor to perform.

Although the preferred embodiment of present invention is shown and described to be employed in a record card distributing machine such as the well-known IBM card collator of the type shown and described in U.S. Patent No. 2,602,544 granted to B. E. Phelps et al. and issued on October 3, 1944, it is not intended to limit the scope of this invention to such a machine. It will be understood that fundamental novel features of the invention are only applied to a preferred embodiment and that various omissions and substitutions and changes in the form and details of the device illustrated and described may be made by those skilled in the art, without departing from the spirit of the invention.

Another object of this invention is to provide an improved data comparator which affords efficient data processing operations.

In keeping with the foregoing, another object of this invention is to provide a data comparator for detecting designated errors and passing the same as though there were no errors.

Another object of this invention is to provide an improved data comparator for comparing orders of data which are correlated in a plurality of relationships.

Another object of this invention is to provide an improved apparatus for reconciling a first entity of data with a second entity of data.

Another object of this invention is to provide an improved apparatus for reconciling a first entity of data with a second entity of data wherein provision is made for selectively shifting the first entity with respect to the second entity.

Other objects of the invention will be pointed out in the following description and claims and illustrated in the accompanying drawings, which disclose, by way of example, the principle of the invention and the best mode which has been contemplated, of applying that principle.

Figure 1:
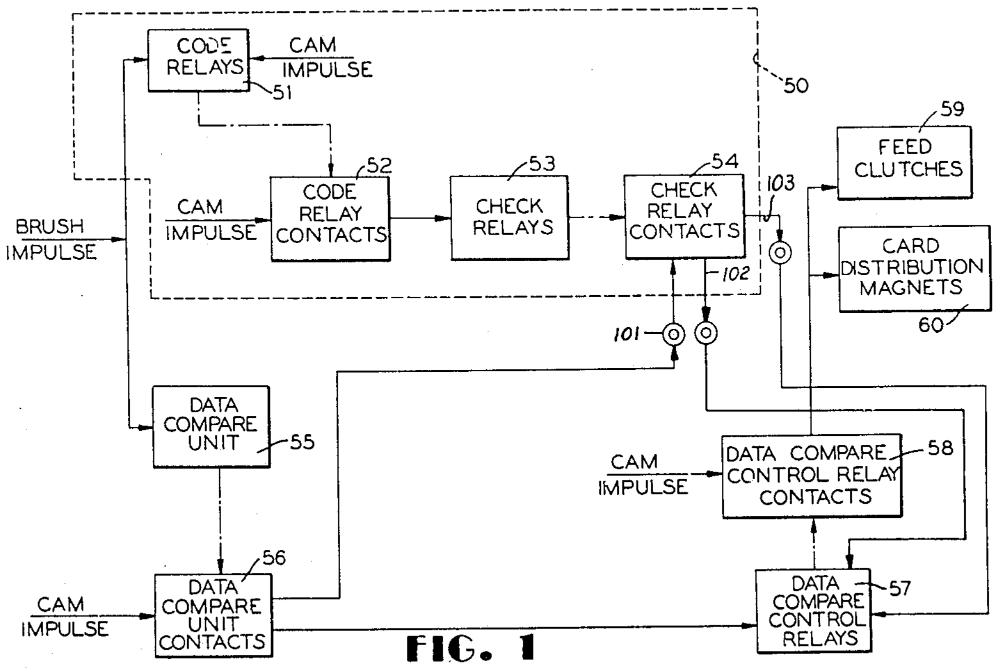

In the drawings:

Fig. 1 is a block diagram depicting the general scheme of operation for a record card collating machine wherein the present invention is shown to be embodied.

Figure 2A:
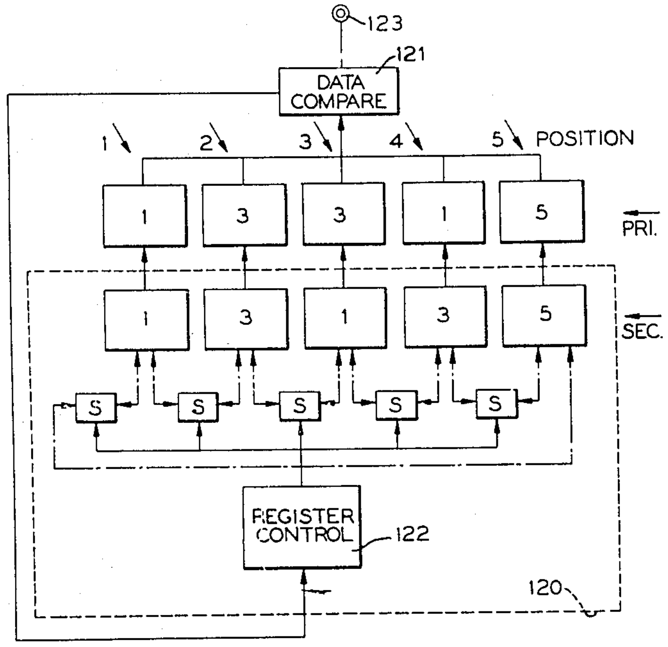
Figure 2B:
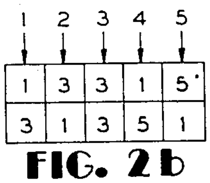
Figure 2C:
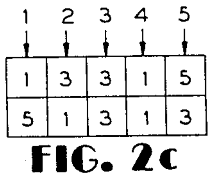

Figs. 2*a* to 2*c*, inclusive, illustrate diagrammatically a shifting register type of data comparator.

Figs. 3, 4*a*—4*c*, 5*a*—5*b*, and 6*a*—6*c* illustrate cross-compare, transposition-of-orders, right-offset and left-offset errors, respectively.

Figure 7A:
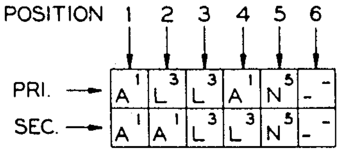
Figure 7B:
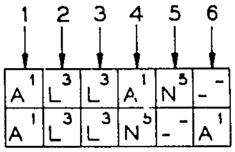
Figure 7C:
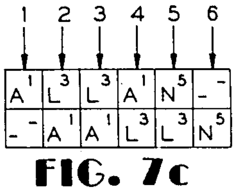

Figs. 7*a* to 7*c*, inclusive, illustrate a transposition-of-orders error between non-adjacent data positions.

Figure 8:
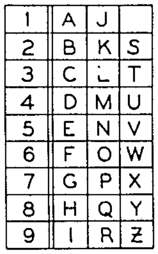

Fig. 8 shows the code configuration used to control the record card collating machine.

Figs. 9a to 9f, inclusive, form a wiring diagram for the data comparator.

As stated previously, the preferred embodiment of the present invention is shown and described to be employed in a record card controlled collator similar to one disclosed in Phelps et al. Patent No. 2,602,544. Inasmuch as this Phelps et al. collator which is similar to the well-known Type 089 IBM machine, is shown and described fully in the aforesaid patent, it will be described only briefly herein with relationship to the block diagram shown in Fig. 1 to thereby avoid unnecessary complexity and undue prolixity in the present specification.

*Introduction*

Referring to Fig. 1, the preferred embodiment of the present invention is indicated in block diagram form to be within broken line 50 as a part of the afore-mentioned collator wherein, once again, the preferred embodiment of the present invention is utilized. The code relays R1 (see also Fig. 9a) –R8 and R25–R64 which are represented in Fig. 1 by block 51, are picked during a machine card feed cycle consequent upon a coincidence between cam directed impulses, e.g., those directed by cam contacts C1 (Fig. 9a) through C4, and record card governed reading brush controlled impulses, e.g., those transmitted from within primary record card data reading station 68. After select code relays are operated so as to manifest the record card data sensed, another cam controlled test impulse is then directed through various "cross-compare" code relay contacts represented in Fig. 1 to be within block 52 and shown in Fig. 9c as contacts R1–2 to R8–2 and R25–2 to R64–2, so as to energize select ones of check relays R9 through R14 which are represented in Fig. 1 to be within block 53. These latter relays are for operating their respective check relay contacts shown in Fig. 9f and represented in Fig. 1 to be within block 54. As the description advances, it will become clear that upon the detection of a predetermined number of cross-compare data errors; i.e., a predetermined number of homologous positions having unmatched orders of data therein, via relays R70 (Fig. 9f) –R74, the secondary expression is shifted one order position to the left so as to set up a different primary and secondary data relationship. A voltage impulse is then directed through other "left shift compare" code relay contacts R1–3 to R8–3 and R25–3 to R64–3 shown in Fig. 9c and represented in Fig. 1 to be within block 52, so as to energize other select ones of check relays R15 (Fig. 9c) through R20 represented in Fig. 1 to be within block 53. These latter relays are also for operating their respective check relay contacts shown in Fig. 9e and represented in Fig. 1 to be within block 54. As will be described in detail hereinafter, the secondary data expression will, once again, be shifted in response to a predetermined number of homologous "left shift compare" positions having unmatched orders of data therein represented by the operation of relays R75 (Fig. 9f) –R79, so as to shift the secondary data two order positions to the right. In view of the fact that the secondary expression is first shifted one order to the left and then is shifted two orders to the right, the resulting arrangement is such that the secondary expression is actually removed one order position to the right with respect to the original position thereof. A voltage impulse is then directed through the "right shift compare" code relay contacts R1–4 to R8–4 and R25–4 to R64–4 (Fig. 9c) represented to be within block 52 in Fig. 1, so as to energize select ones of check relays R21–R24 and R65–R66 represented in Fig. 1 to be within block 53. These latter relays operate their respective check relay contacts shown in Fig. 9e and represented in Fig. 1 to be within block 54. The secondary data expression will be shifted for the last time one position to the left in response to a predetermined number of homologous "right shift compare" positions having unmatched orders of data therein as is represented by the operation of relays R81 (Fig. 9f) –R85. This last shift operation brings the secondary data expression to its original position with respect to the primary data expression. A voltage impulse is then directed through the "cross-compare" code relay contacts R1–2 to R8–2 and R25–2 to R64–2 (Fig. 9c) in order to operate select ones of check relays R9–R14 once again. These latter relays operate their respective check relay contacts shown in Fig. 9e so as to direct a voltage signal to either "equal" data line 102 or "unequal" data line 103. It will become clear as the description advances that although the primary and secondary data expressions as originally manifested by the code relays, may not match, if the difference in expressions is due to one of the previously mentioned so-called human errors, a voltage signal along "equal" data line 102 will be realized so as to effect the broad object of the present invention, that is, to pass certain data unequals as though they were equals.

Figure 3:
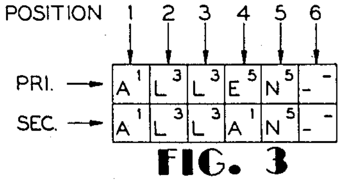

The collating machine described in the aforementioned Phelps et al. patent is, in general, represented in Fig. 1 by blocks 55 through 60. In view of the fact that this machine is described in detail in the said patent, and since the machine per se is not a part of the present invention, it is necessary to describe the machine only briefly. Record card data reading brush impulses which are directed to a data compare unit 55 similar to that shown in Fig. 3a of the Phelps et al. patent, cause a transfer of select data representing compare unit contacts represented by block 56. These contacts might be arranged similarly to those shown in Fig. 3e of the Phelps et al. patent. If the data to be compared are unequal, a cam governed test impulse will be directed through the labyrinth of compare contacts represented by block 56, and to the labyrinth of check relay contacts within block 54 via hub 101. On the other hand, if the data entered into unit 55 are equal, the afore-mentioned test impulse will be directed through the labyrinth of compare contacts 56 directly to the data compare control relays in block 57 via the equal data line. The reason for this should be clear inasmuch as if the primary and secondary data being compared are equal, there is no need to use the present invention which passes certain unequals as equal. Therefore, the apparatus representing the present invention may, in general, be by-passed when the original primary and secondary expressions are matched. However, if the data being compared are unequal, it is still necessary to determine whether these data have a predetermined relationship which calls for passing the data as equal. If there is this relationship, such as a single cross-compare error as shown in Fig. 3 for example, the present invention will, in effect, instruct the collating machine to overlook the unmatched relationship and to pass the unequal data as equal data.

As is shown in Fig. 1, the check relay contacts block 54 has two output lines 102 and 103 (see also Fig. 9f). If the primary and secondary data detected as being unequal by the data compare unit block 55 (Fig. 1), is a particular type of so-called human error which it is desired to pass as no error at all, an impulse signal will appear along the line 102, which impulse will appear as an equal data compare impulse when applied to the data compare control relays 57. On the other hand, if these unequal data do not fall within any of the categories to be passed as equal data, an impulse signal will appear along the line 103, which signal will then effect the operation of a so-called unequal data compare control relay within block 57. The energization of the data compare control relays (not shown) in block 57 set up the collator governing control relay contacts represented by block 58. A cam impulse directed through the contacts in unit 58 controls the familiar IBM collator primary, secondary and eject feed clutches represented by block 59, as well as the record card distribution magnets represented by block 60. The operation of the latter mentioned apparatus is in a manner similar to that shown and described in the afore-mentioned Phelps et al. patent and in a manner well known to those persons having ordinary skill in this art.

*Data comparator general description*

The present invention pertains to a concept wherein one expression of information is shifted successively in a plurality of directions with respect to a predetermined starting position, to thereby alter the correlative relationship between orders of first, or primary, and second, or secondary, data groups. Although the embodiment of the present invention is directed to an electromechanical apparatus, it will be apparent to persons familiar with the art that the afore-mentioned shifting apparatus is particularly desirable in, and applicable to, high speed electronic data comparing operations. This type of data comparing device may employ an electronic shifting register such as is shown diagrammatically in Fig. 2*a* wherein, for example, a primary value 13315 is being compared with a secondary value 13135. The homologous positions in Fig. 2*a* having orders therein which are unmatched, are positions 3 and 4. Thus, as the homologous positions are being analyzed one by one, upon the detection by data compare unit 121 of a predetermined number of unequal data orders, i.e., the second unmatched homologous data condition in position 4, the shifting register represented by broken line 120, and having therein the expression of secondary information, will be controlled to shift the secondary data therein one position to the left (see Fig. 2*b*). Data compare unit 121 not only will detect the second unmatched position, i.e., position 4, but will also govern register control 122 so as to effect the aforesaid shift via the electronic switches represented by blocks S. Inasmuch as the afore-mentioned second unmatched condition occurred in comparing position 4, the data comparator operation is governed so that data comparison after the first shift to the left will begin with position 3 (see Fig. 2*b*), the position preceding the position having the second unmatched order of data. As is shown, position 3 in Fig. 2*b* contains matched orders of data, whereas position 4 thereof contains unmatched orders of data. Upon the detection of a predetermined number of "left shift comparison" unequal orders, i.e., the unmatched data condition in position 4 of Fig. 2*b*, the shifting register 120 will once again be controlled by data compare unit 121 to effect a shift of the secondary data therein. This shift, however, will be two order positions to the right so as to align the orders of data as is shown in Fig. 2*c*. The data comparator is so governed that "right shift" data comparing after this shift of orders of data to the right will begin at position 4 of Fig. 2*c* wherein the data in the present example are equal. However, the data in position 5 are not equal, and the detection of a predetermined number of "right shift comparison" unequal orders, i.e., the unequal order of data in position 5, will cause the register control 122 to shift the secondary data in register 120 one order position to the left for a second time. It may be seen that this third shift of data will return the data in the secondary expression of information, to the home, or starting, position shown in Fig. 2*a*. The unmatched condition detected by the "right shift compare" operation during the preceding comparing position (see Fig. 2*c*), i.e., the operation after the shift of data two positions to the right, causes a cross-compare operation after the third, and last, shift of data to the left to begin in position 5. Inasmuch as the orders of data contained in position 5 (Fig. 2*a*) are equal, the transposition of adjacent orders of data in positions 3 and 4 will be detected as such, and the two expressions of information will be indicated as being matched by an impulse directed from compare unit 121 to hub 123.

It is apparent that either or both primary and secondary expressions of information may be contained within shifting registers which can be controlled as taught herein.

*Operation and remaining circuits*

Figure 9A:
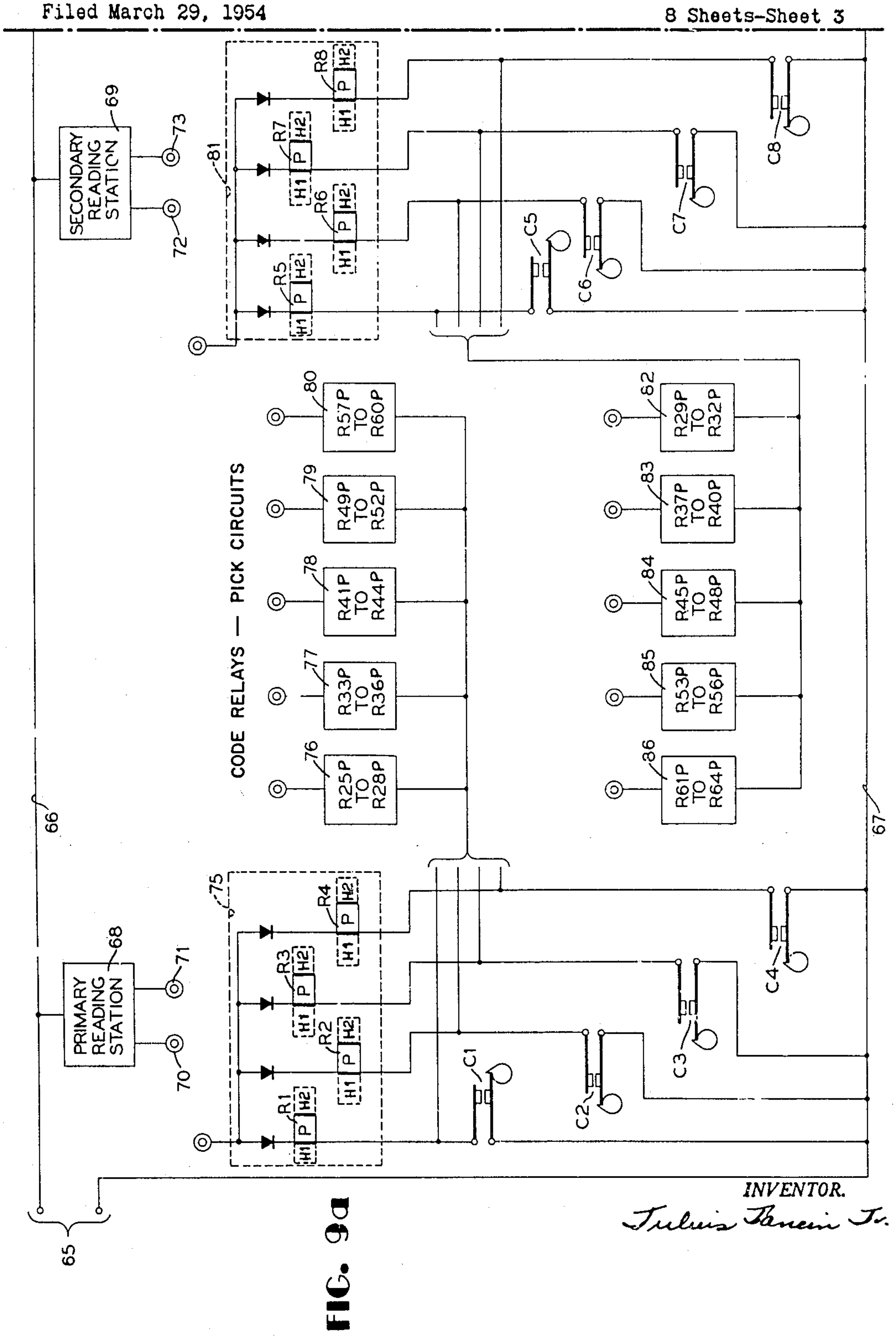
Figure 9D:
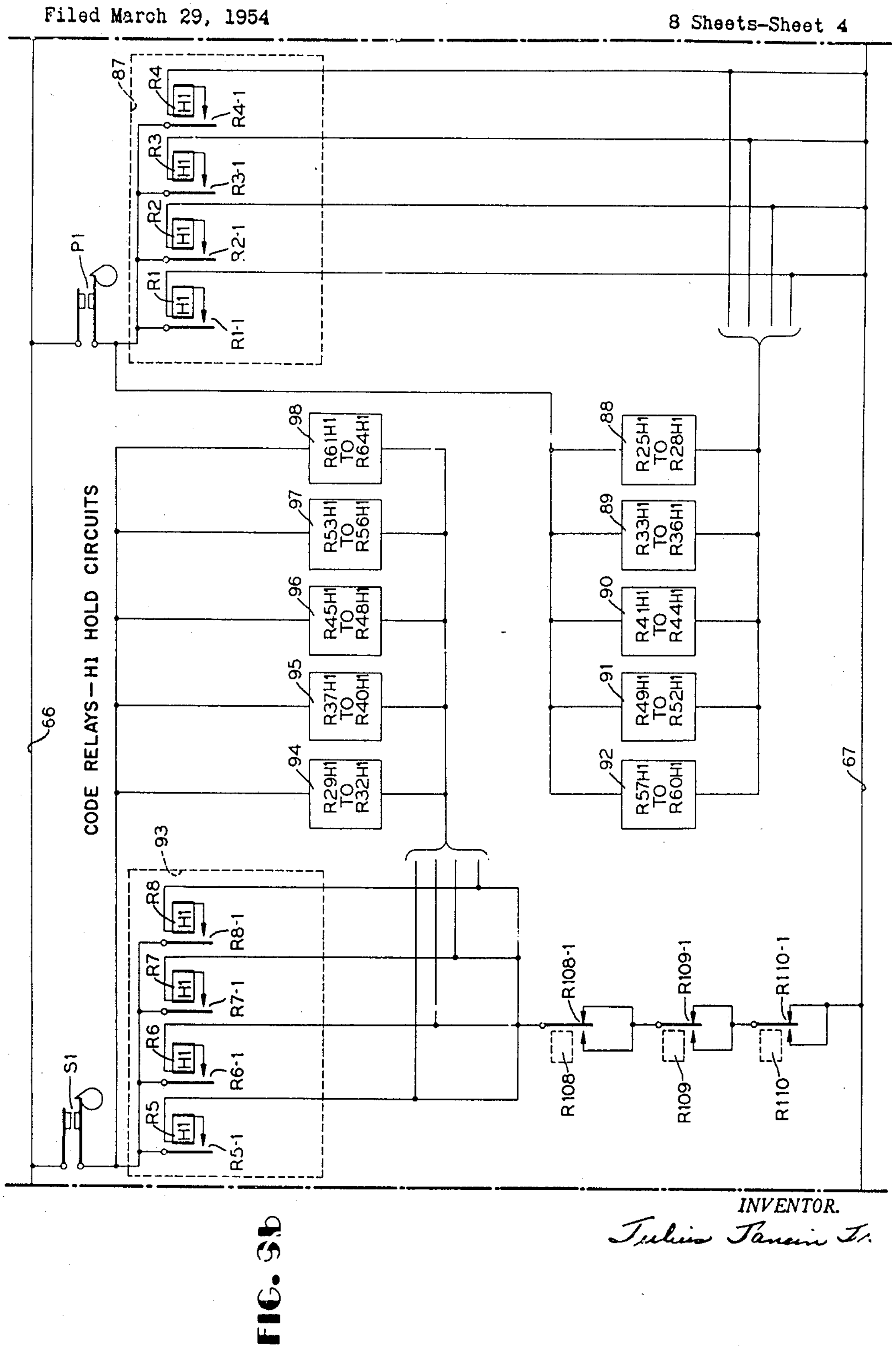

Referring to Fig. 9*a*, a suitable power supply represented by bracket 65 causes operating voltages to be applied to lines 66 and 67. Blocks 68 and 69 represent the primary and secondary reading stations which include reading brushes for sensing record card indicia. Hubs 70 and 71 are each connected to the primary brushes for reading primary card columns, columns 1 and 80 respectively for example, and hubs 72 and 73 are each connected to the secondary brushes for reading respective secondary card columns, columns 1 and 80 for example.

Code relay units 75 through 80 are associated with the primary card reading station, and code relay units 81 through 86 are associated with the secondary card reading station. It will be recalled that the code relays R1–R8 and R25–R64 are represented in Fig. 1 by block 51. Only primary unit 75 and secondary unit 81 are shown in detail, and they comprise relays R1–R4 and R5–R8, respectively, each having a pick coil P and hold coils H1 and H2. Cams C1 and C5 are timed so that their contacts close at 1, 4 and 7 index times which correspond to related indicia points in a record card; cams C2 and C6 are set so that their contacts close at 2, 5 and 8 index times; cams C3 and C7 are timed so that their contacts close at 3, 4, 5 and 9 index times; and cams C4 and C8 are set so that their contacts close at 6, 7, 8 and 9 index times. Hence, the P coils of code relays R1 through R8 are conditioned for energization in accordance with the following code:

1 index time—relays R1 and R5.
2 index time—relays R2 and R6.
3 index time—relays R3 and R7.
4 index time—relays R1, R3, R5 and R7.
5 index time—relays R2, R3, R6 and R7.
6 index time—relays R4 and R8.
7 index time—relays R1, R4, R5 and R8.
8 index time—relays R2, R4, R6 and R8.
9 index time—relays R3, R4, R7 and R8.

Coincidently timed reading brush impulses from line 66 through stations 68 and 69 and the rectifiers in units 75 and 81, cause the energization of these relays in accordance with the data sensed.

One of two hold coils, i.e., coils H1, for the relays R1 through R8 are shown in Fig. 9*b* to be in blocks 87 and 93, respectively. The H1 hold coils within blocks 87 through 92 are associated with the pick coils in blocks 75 through 80, respectively, and the H1 hold coils within blocks 93 through 98 are associated with the pick coils in blocks 81 through 86, respectively. As is shown, the H1 hold coils are energized through their respective stick points whenever the relay, associated with a particular hold coil, is picked. The primary code relay H1 hold coils represented as R1 through R4 for example, are held operated through primary cam P1, whereas the code relay H1 hold coils such as R5 through R8 for example, are held up through secondary cam S1. Inasmuch as the aforesaid normally closed primary and secondary cams operate only during the operation of a corresponding primary and secondary feed, these cams are used to control the hold coils of the code relays so that those relays which are picked during one machine cycle will remain picked for the number of machine cycles that the corresponding feed is stopped.

Figure 9C:
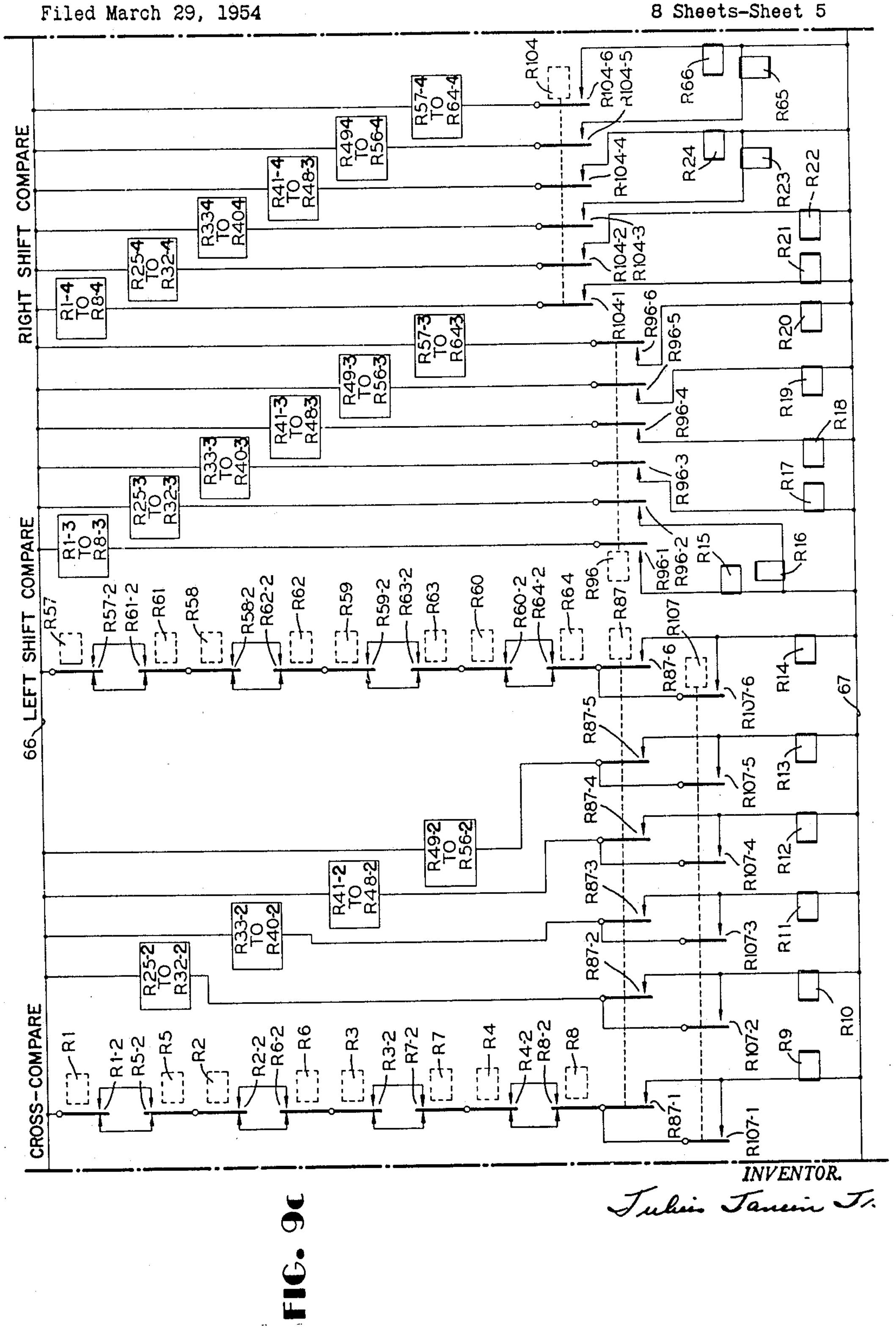
Figure 9D:
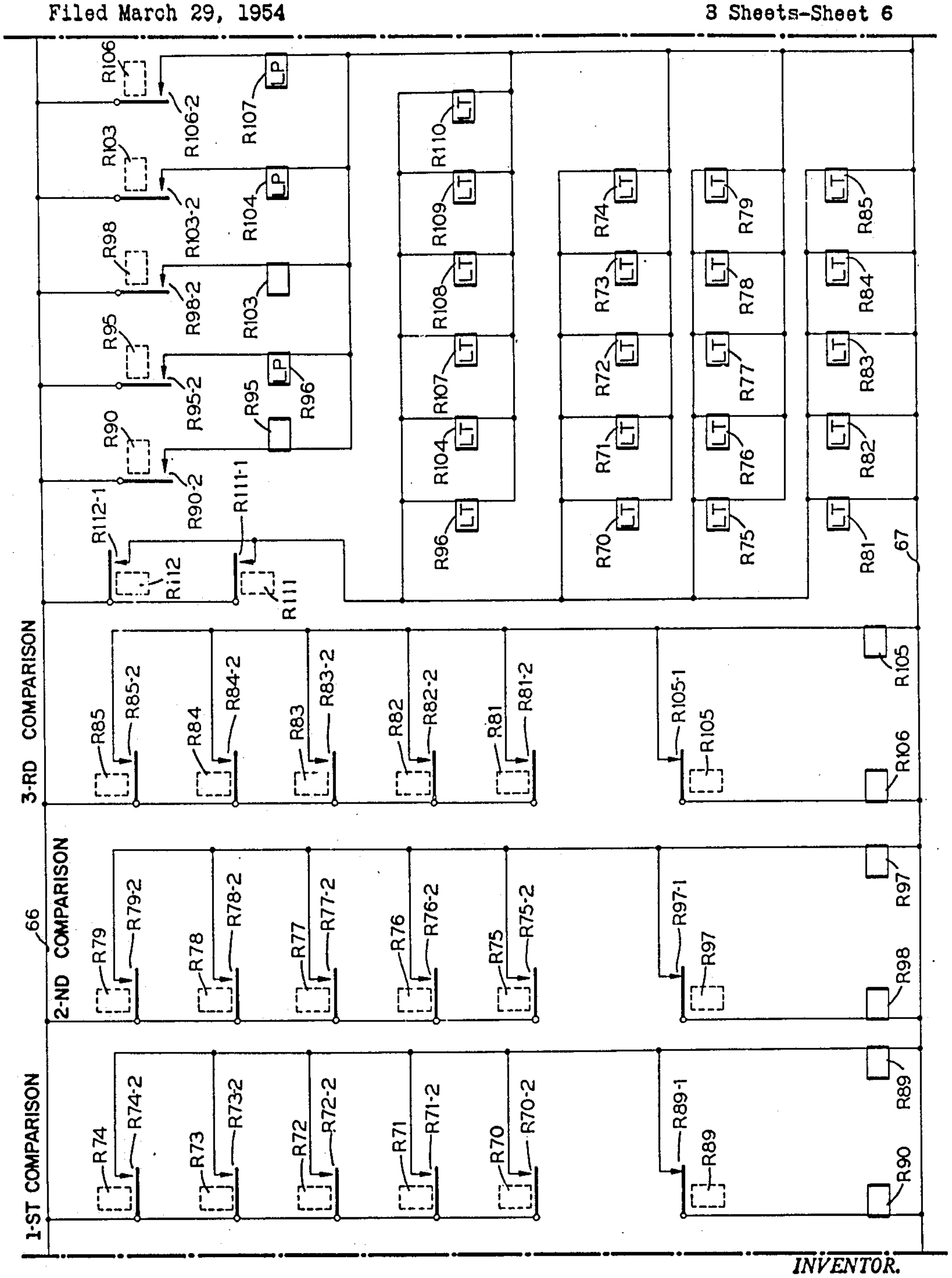

The code relay contacts represented by block 52 in Fig. 1, are shown in Fig. 9*c*, and the circuits having these contacts therein are divided into three categories; namely, a cross-compare check relay group including the circuits having relays R9 through R14 therein; a left-shift compare category including the circuits having relays R15 through R20 therein; and a right-shift compare category including the circuits having relays R21 through R24, R65 and R66 therein. These check relays are represented by block 53 in Fig. 1 as stated previously. The check relay contacts represented in Fig. 1 by block 54 and controlled by relays R9 through R24, R65 and R66, are shown in Fig. 9*f*, to be interposed between a single input line 104, and an equal output line 102 or an error output line 103.

The several errors referred to hereinbefore as cross-compare, transposition-of-orders, right-offset and left-offset, will now be applied to the data comparator circuits shown in Figs. 9*a* through 9*f*.

*Cross-compare.*—In accordance with the code configuration of Fig. 8, the letters shown in Fig. 3 are represented by the numerals associated therewith. It is necessary to point out that although one numeral represents a plurality of letters, for example the numeral 2 represents the letters B, K and S, the number of errors occurring as a result thereof is not significant, so that even with the occurrence of these errors, the over-all operation of the present invention affords efficient operations. Letters are used in the examples cited herein so as to indicate the applicability of the present invention to characters as well as to numerals. It is possible, of course, to code each of the alphabetic letters separately and in much the same fashion as is done on existing machines, such as the afore-mentioned well-known Type 089 IBM Alphabetic Collator.

Referring to Fig. 9*f*, an impulse applied to hub 101, said impulse being transmitted through data compare unit contacts 56 (see also Fig. 1) during collator compare time because of an unequal data determination by data compare unit 55, will cause the energization of start compare relay R86. It will become clear as the description advances that the energization of this start relay will start data compare operations as effected by the preferred embodiment of this invention. Relay R86 is maintained picked by a hold circuit which is completed from line 66 through contacts R86–1, R111–2, and R112–2, relay coil R86H, to the other side of the line. The transfer of contacts R86–2 will apply a voltage to input line 104 so as to cause the energization of parallel connected relays R87 and R88 via contacts R96–2. Relay R88 is a slow-to-operate type relay, such relays being well known in the electrical art. Thus, contacts R87–1 (see also Fig. 9*c*) through R87–6 will transfer prior to contacts R88–1 (Fig. 9*f*) doing so. Consequent upon the transfer of the afore-mentioned contacts associated with relay R87, check relays R9 (Fig. 9*c*) through R14 will be energized if the orders of data in their corresponding positions are equal.

Referring to Fig. 3, inasmuch as the orders of data in the first three positions are equal, corresponding homologous code relays in block 51 (see also Fig. 1) to indicate equal, or matched, data positions will be picked for the first three positions. This is also true of the fifth and sixth positions because the data within each of these positions are the same. However, a cross-compare unmatched condition will be detected in the fourth position because check relay R12 (Fig. 9*c*) will not be energized. That is, for the situation depicted by Fig. 3 only check relays R9, R10, R11, R13 and R14 will be energized to thereby indicate an unmatched condition in position 4. Relay R9, for example, is energized by electric power applied thereto from line 66 through contacts R1–2 normally open (n/o), R5–2 n/o, R2–2 normally closed (n/c), R6–2 n/c, R3–2 n/c, R7–2 n/c, R4–2 n/c, R8–2 n/c and R87–1, relay R9, to line 67. Hence, referring to Fig. 9*f* once again, after the check relays R9–R11 and R13–R14 are picked and after slow-to-pick relay R88 is in an operated status, a voltage applied to input line 104 will be directed through contacts R96–2, R88–1, R9–1 n/o, R10–1 n/o, R11–1 n/o, R12–1 n/c, R13–2 n/o, and R14–2 n/o, to equal output line 102. Consequently, a single cross-compare error will be passed as an equal. It should be clear from an examination of Fig. 9*f* that whenever only one check relay is maintained de-energized, a signal will appear at equal line 102.

The voltage applied to equal output line 102 is also applied to relay R111. The energization of relay R111 causes its contacts R111–2 to transfer, whereby relay R86 is caused to drop out. In turn, relays R87 and R88 are dropped out as are the energized check relays. Accordingly, the entire circuit arrangement representing the preferred embodiment of the present invention is ready for another operation.

Figure 4A:
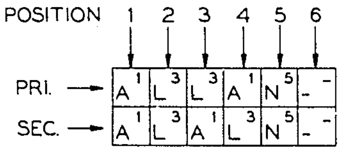

*Transposition-of-orders.*—Referring to Fig. 4*a*, it may be seen that the first homologous position having an unmatched data condition is comparing position 3, and the second such position is adjacent comparing position 4. Hence, check relays R9 (see also Fig. 9*c*), R10, R13 and R14 will be picked, after relay R87 (Fig. 9*f*) is energized in the manner described previously, to indicate equal orders of data in respective comparing positions 1, 2, 5 and 6. Thus, an electrical voltage applied to line 104 after relays R86, R87 and R88 are picked, will be directed through contacts R96–2, R88–1, R9–1 n/o, R10–1 n/o, R11–1 n/c, and R12–2 n/c, latch picked relay R72LP, to the other side of the line. As is indicated in Fig. 9*f*, relays R70–R79 and R81–R85 are latch type relays which remain mechanically picked, once the latch pick coil is energized, until the associated latch trip coil (see also Fig. 9*d*) is energized to unlatch and drop out the relay.

Relay R72LP having been picked, slow-to-operate relay 89 (Fig. 9*d*) and relay R90 are energized through contacts R72–2. The transfer of contacts R90–1 (Fig. 9*e*) causes the data in the secondary expression orders to be entered into so-called left shift intermediate storage prior to being shifted. The left shift intermediate storage units, one for each order of secondary data, are identified in Fig. 9*e* by reference numerals 20 through 25; only unit 20 being shown in detail. The remaining units 21–25 each being identified with respective secondary data code relay contacts for effecting a left shift by causing the selective energization of left shift intermediate storage relays (not shown) similar to relays R91–R94 in unit 20. Thus, referring to Figs. 4*a* and 9*e*, the data in secondary position 2 is entered into intermediate storage unit 20; that data in secondary position 3 is entered into storage unit 21; that data in secondary position 4 is entered into storage unit 22; etc.

Figure 4B:
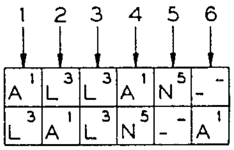
Figure 9E:
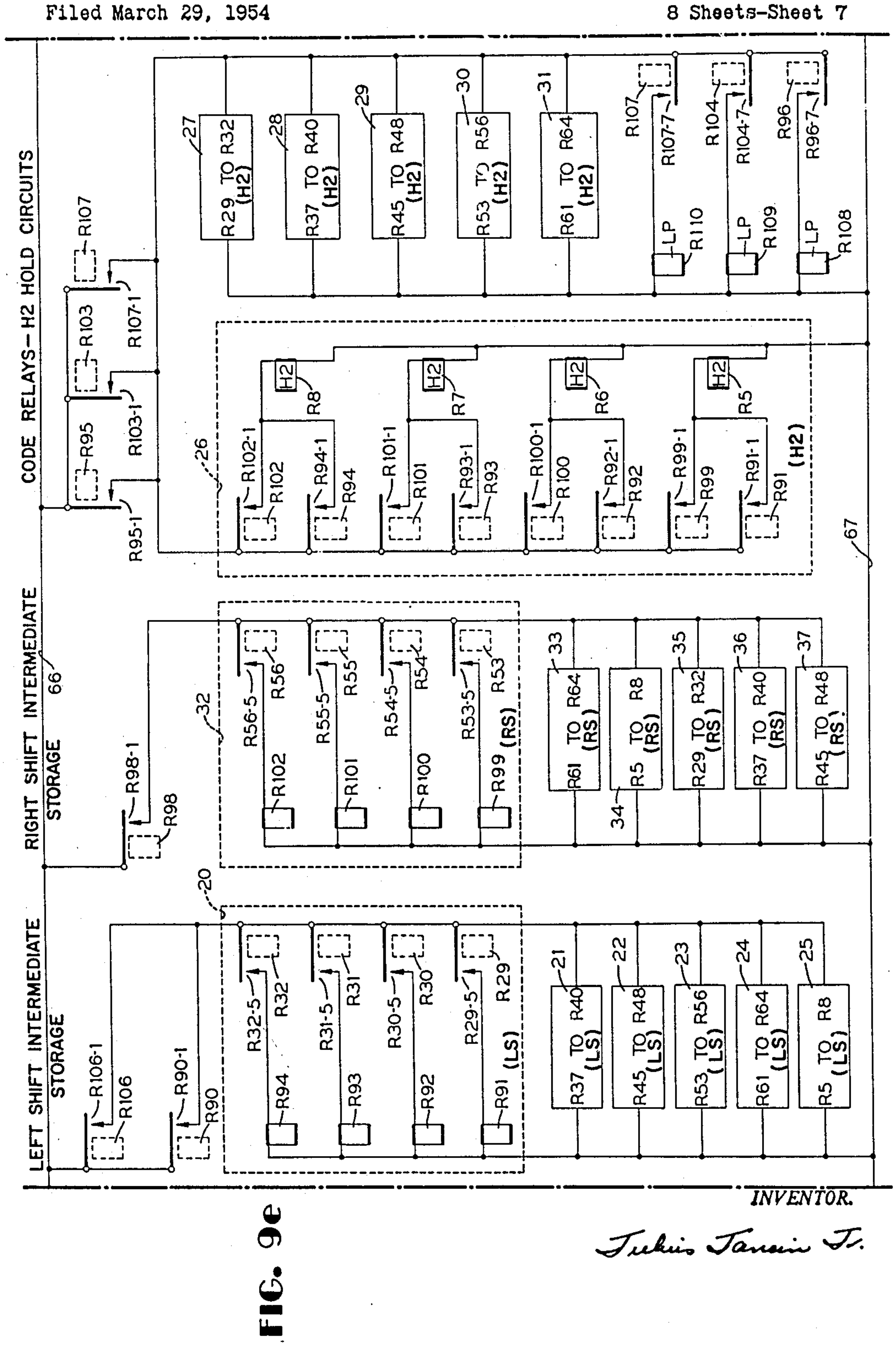
Figure 9C:
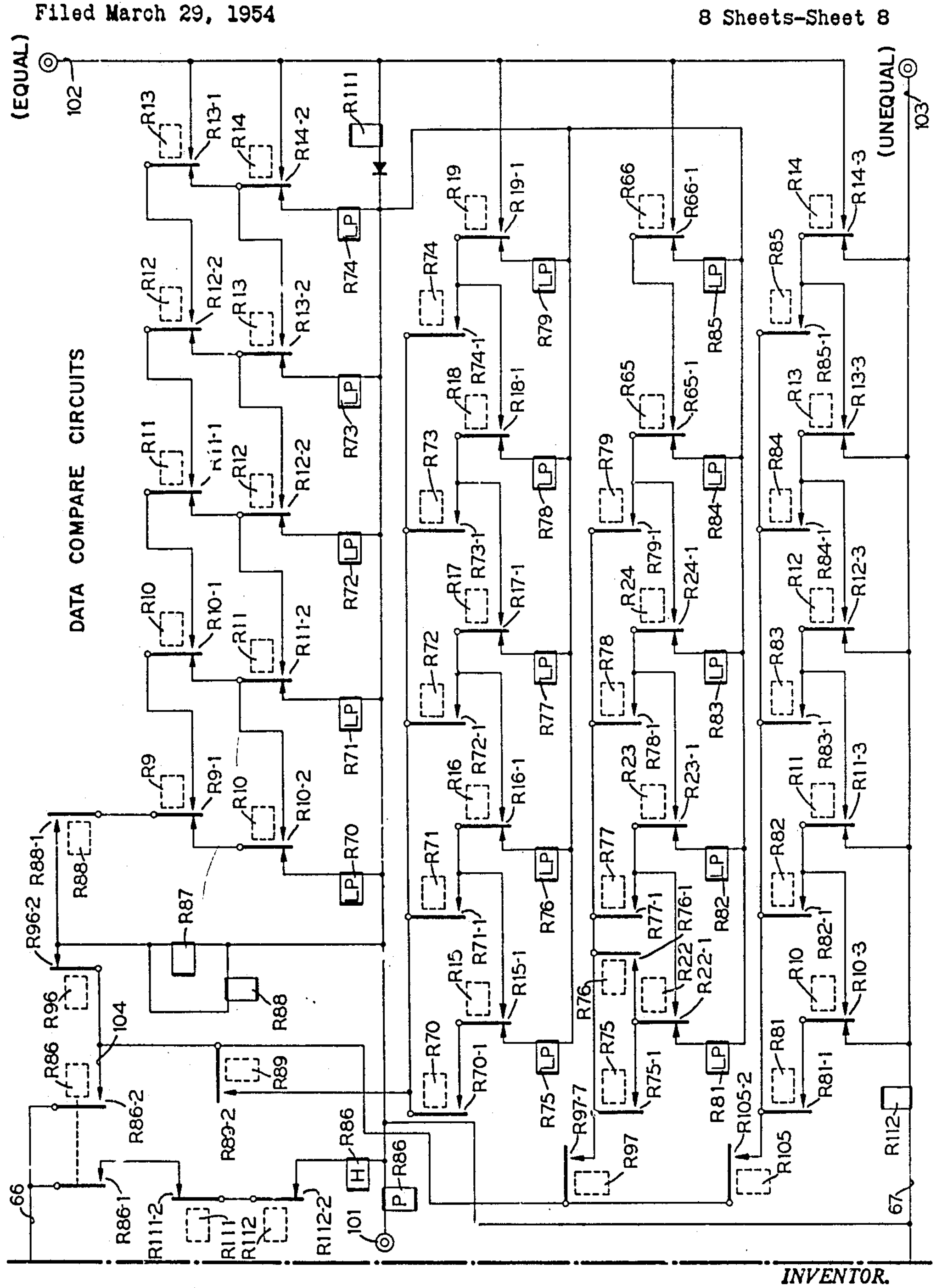

Along with the transfer of secondary data into intermediate storage effected by the transfer of contacts R90–1 (Fig. 9*e*), relay R95 (Fig. 9*d*) is energized when contacts R90–2 transfer. Hence, consequent upon the transfer of contacts R95–1 (Fig. 9*e*), the secondary data in left shift intermediate storage units 20 through 25 is entered into the secondary data order positions identified by reference numerals 26 through 31, respectively. This will become clear when it is realized that the units identified by reference numerals 26 through 31 include the second of two hold coils, i.e., coils H2, associated with the code relays in blocks 93 (Fig. 9*b*) through 98, respectively. Consequently, the data originally in the second secondary position (Fig. 4*a*) which was entered into intermediate storage unit 20 (see also Fig. 9*e*) when contacts R90–1 closed, is now entered into code relay H2 unit 26 which is associated with the first secondary position; that which was entered into storage unit 21 is now entered into unit 27, etc. That is, the letter L in the second order of the secondary expression shown in Fig. 4*a*, is originally represented by the energization of relay R31P in block 82 (Fig. 9*a*). Subsequently, when relay R90 is operated whereby contacts R90–1 (Fig. 9*e*) are closed, the data represented by the energization of code relay R31 is entered into left shift intermediate storage relay R93. Thereafter, when contacts R95–1 are closed, the data in left shift intermediate storage represented by the energization of relay R93 is caused to be transferred to the first order position of the secondary expression as shown in Fig. 4*b*. This is brought about, of course, by the energization of coil R7H2 (Fig. 9*e*). It is in this fashion that the data is shifted one position to the left.

It is necessary to point out that when slow-to-operate relay R89 (Fig. 9*d*) is picked, relay R90 is de-energized due to the transfer of contacts R89–1. This, in turn, causes a de-energization of the magnets in intermediate storage units 20 (Fig. 9*e*) through 25. The de-energization of relay R95 (Fig. 9*d*) when contacts R90–2 drop out, causes the circuits to units 26 (Fig. 9*e*) through 31 to open.

The transfer of contacts R95–2 (Fig. 9*d*) will cause the energization of latch pick relay R96. The transfer of contacts R96–7 (Fig. 9*e*) will cause the energization of latch pick relay R108 which will open the circuit to any and all code relay H1 hold circuits shown in Fig. 9*b*. These circuits will be opened but momentarily until the transfer point engages the normally open point. It is in this fashion that all of the code relay H1 hold coils not associated with operated code relay H2 hold coils (see also Fig. 9*e*), are caused to drop out. To amplify this a bit more, when the second order data in the secondary expression of Fig. 4*a* is transferred to the first order position, this is done by the energization of select H2 hold coils. At the time of this transfer, there will be code relays in order position 1 which will be in an operated status due to representing the original first order secondary expression data. When the H1 hold coil circuits are opened by the operation of contacts, such as R108–1 (Fig. 9*b*) for example, the only data which will remain in order position 1 will be that represented by the operation of select H2 coils. Of course, when the H1 hold circuit opening contacts make on the other side, those H1 hold coils associated with respective H2 hold coils will also be placed in an operated status via their respective stick points. The transfer of contacts R96–1 (Fig. 9*c*) through R96–6, in turn, effects a comparison of the now homologous positions shown in Fig. 4*b*; i.e., a comparison of the positions of data in a second relationship after the secondary expression has been shifted one order to the left. During this second comparison, check relay R17 is energized due to the fact that the orders of data in the third position of Fig. 4*b* are equal. However, check relay R18 for the fourth comparison position will not be energized due to the fact that the orders of data in the fourth position of Fig. 4*b*, are unequal. Since contacts R72–1 (Fig. 9*f*) are transferred, latch pick relay R72 having been picked during the first data comparison, a voltage applied to line 104 will be directed to contacts R72–1 after slow-to-operate relay contacts R89–2 are transferred, through contacts R17–1 n/o and R18–1 n/c, relay R78LP, to the other side of the line. As stated previously, contacts R96–7 (Fig. 9*e*) cause the energization of relay R108LP whose contacts R108–1 (Fig. 9*b*) momentarily open the circuits to the H1 hold coils in units 93 through 98. As a result, only those secondary H1 hold coils in units 93 through 98 corresponding to the relays in units 26 (Fig. 9*e*) through 31 will be energized to thereby indicate the secondary data shown in Fig. 4*b*.

Figure 4C:
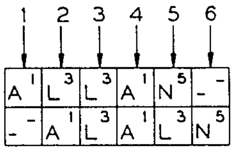

Referring once again to Fig. 9*d*, the energization of relay R78LP and the closing of contacts R78–2 causes slow-to-operate relay R97 and relay R98 to become energized. The resulting transfer of contacts R98–1 (Fig. 9*e*) causes the data in the secondary order positions shown in Fig. 4*b* to be entered into right shift intermediate storage units identified by reference numerals 32 through 37, only storage unit 32 being shown in detail the remaining units 32–37 each being identified with secondary data code relay contacts for effecting a right shift, so as to energize right shift intermediate storage relays similar to relays R99–R102. The transfer of contacts R98–2 (Fig. 9*d*) will cause the energization of relay R103 whose contacts R103–1 (Fig. 9*e*), in turn, complete a circuit to units 26 through 31. As is shown in Fig. 9*e*, contacts of the right shift intermediate storage relays, R99–1 through R102–1 for example, are used to control the secondary order H2 relay hold coils in units 26 through 31 in much the same manner as the left shift intermediate storage relays, such as relays R91–R94 for example, contol the code relay H2 hold circuits. Consequently, the secondary data is shifted two orders to the right in much the same manner that the secondary data was previously shifted one order to the left. To explain this further, after the first left shift operation whereby the secondary expression was altered from that shown in Fig. 4*a* to that shown in Fig. 4*b*, the fifth order position of the secondary expression had blank data stored therein (see Fig. 4*b*). Hence, after contacts R98–1 (Fig. 9*e*) close, the same blank data were transferred into right shift intermediate storage unit 32. Thereafter, when contacts R103–1 close, the same blank data stored in right shift intermediate storage unit 32 was caused to be entered into order position 1 as represented by the code relay H2 hold coils in unit 26. Thus, inasmuch as the blank data are represented by all relays for a given position to be in a de-energized status, none of the R5H2–R8H2 coils will be energized. Hence, after the right shift operation has been completed, the blank data will appear in order position 1 of the secondary expression as shown in Fig. 4*c*. The transfer of contacts R103–2 (Fig. 9*d*), relay R103 (Fig. 9*d*) having been energized via contacts R98–2, causes the energization of relay R104LP which effects a comparison of the orders of data shown in Fig. 4*c*, i.e., a comparison via its contacts after the secondary data are shifted from its home, or starting, position, one order to the right. As is shown in Fig. 9*c*, this comparison is under control of contacts R104–1 through R104–6, and results in check relay R24 becoming energized and the fifth position check relay R65 remaining de-energized.

The transfer of contacts 104–7 (Fig. 9*e*) causes the energization of relay R109LP whose contacts R109–1 (Fig. 9*b*) momentarily open the circuits to the code relay H1 coils in units 93 through 98. As a result, only those secondary hold coils corresponding to the relays picked in units 26 (Fig. 9*e*) through 31 will be energized to thereby indicate the arrangement of secondary data shown in Fig. 4*c*. It should be recognized that this is similar to what takes place when the data are shifted to the left. Thus, after slow-to-operate relay contacts R97–7 (Fig. 9*f*) transfer, a voltage will be directed from input line 104 through contacts R97–7, R78–1, R24–1 n/o, and R65–1 n/c, relay R84LP, to the other side of the line.

The transfer of slow-to-operate relay contacts R97–1 (Fig. 9*d*) will cause the de-energization of relay R98 whose contacts R98–1 (Fig. 9*e*) will open the circuits to intermediate storage units 32 through 37. In addition thereto, relay R103 (Fig. 9*d*) will be de-energized when contacts R98–2 open. The resulting drop-out of contacts R103–1 (Fig. 9*e*) will open the circuits to units 26 through 31.

The energization of relay R84LP (Fig. 9*f*) will cause the energization of relay R106 (Fig. 9*d*) and slow-to-operate relay R105 so as to thereby, once again, place the secondary orders of data into left shift intermediate storage units 20 (Fig. 9*e*) through 25 consequent upon the transfer of contacts R106–1. Contacts R106–2 (Fig. 9*d*) will cause the energization of relay R107LP whose contacts R107–1 (Fig. 9*e*), in turn, direct the data already entered into storage units 20 through 25 to be entered into units 26 through 31, respectively. The transfer of contacts R107–7 will cause the energization of relay R110LP so that contacts R110–1 (Fig. 9*b*) will momentarily open the hold circuits to the code relay H1 hold coils in units 93 through 98. Consequently, the secondary data will once again be arranged in a manner such as is shown in Fig. 4*a*, and upon the transfer of slow-to-operate relay contacts R105–2 (Fig. 9*f*), after contacts R107–1 (see also Fig. 9*c*) through R107–6 transfer, a voltage will be directed from input line 104 (Fig. 9*f*) through contacts R105–2, R84–1, R13–3 n/o, and R14–3 n/o, to equal output line 102. It might be pointed out here that code relays R9 and R10 were also energized, but are of no particular significance during the latter comparison operation. As mentioned previously, the voltage applied to equal output line 102 will cause the energization of relay R111. The energization of the latter relay causes contact R111–1 (Fig. 9*d*) to close, to thereby energize the latch trip coils of latch type relays R70–R79 and R81–R85, R96, R104, R107–R110, so that all of the latch type relays picked during a data processing operation, are dropped out in preparedness for the next data comparing operation. In addition, contacts R111–2 (Fig. 9*f*) will open the circuit to relay R86H.

*Right-offset.*—As is shown in Fig. 5*a*, the positions having unmatched orders of data therein are positions 4, 5 and 6, the orders of secondary data in these positions being offset to the right with respect to the primary data. As a result, during the cross-compare operation only check relays R9 (Fig. 9*c*) through R11 are picked when contacts R87–1 through R87–6 are transferred consequent upon the energization of relay R87 (Fig. 9*f*) as aforedescribed, for the reason that the primary and secondary data in the first three order positions are equal. Hence, a voltage impulse applied to hub 101 (Fig. 1) and thereby to input line 104 (Fig. 9*f*) after slow-to-operate relay R88 is picked to cause contacts R88–1 to transfer, will be transmitted through relay contacts R96–2, R88–1, R9–1 n/o, R10–1 n/o, R11–1 n/o, R12–1 n/c, and R13–2 n/c, relay R73LP, to the other side of the line.

The energization of relay R73LP will cause contacts R73–2 (Fig. 9*d*) to effect the energization of relay R90 and slow-to-operate relay R89. In exactly the same manner as explained previously, the data in the secondary order positions will be shifted one order to the left by means of left shift intermediate storage units 20 (Fig. 9*e*) through 25 and code relay H2 hold data units 26 through 31, so that upon the transfer of contacts R96–1 (Fig. 9*c*) through R96–6, the orders of data arranged in the fashion shown in Fig. 5*b* will be compared. It will be recalled that latch pick relay R96 (Fig. 9*d*) is energized via contacts R95–2, and that relay R95 is energized via contacts R90–2, which contacts are governed by the same relay as are contacts R90–1 (Fig. 9*e*) for effecting the left shift intermediate storage operation. As a result of this second comparison effected by the operation of contacts R96–1 through R96–6 (Fig. 9*c*), check relays R15, R16 and R20 are not energized in view of the unequal data in the first, second and sixth positions (see also Fig. 5*b*), whereas check relays R17, R18 and R19 are energized due to equal data in positions 3–5. Hence, a voltage applied to input line 104 (Fig. 9*f*) will be transmitted through contacts R89–2, R73–1, R18–1 n/o, and R19–1 n/o, to equal output line 102, to thereby pass a right-offset difference in expressions as an equal. Relay R111 will once again be energized so that its contacts R111–1 (Fig. 9*d*) and R111–2 will cause energization of the latch trip coils, and de-energization of relay R86H.

*Left-offset.*—Referring to Fig. 6*a*, it may be seen that the homologous positions having unmatched data therein are once again positions 4, 5 and 6, the orders of secondary data in these positions, however, being offset to the left with respect to the primary data. Accordingly during the cross-compare operation, check relays R9 (Fig. 9*c*) through R11 are caused to pick when contacts R87–1 through R87–6 transfer, after relay R87 (Fig. 9*f*) is caused to pick. These check relays are energized because the data in postions 1–3 as shown in Fig. 6*a*, are equal. Thus, a voltage impulse directed to hub 101 (Fig. 1) and then to line 104 (Fig. 9*f*) after slow-to-operate relay R88 is picked, is transmitted through contacts R96–2, R88–1, R9–1 n/o, R10–1 n/o, R11–1 n/o, R12–1 n/c and R13–2 n/c, relay R73LP, to the other side of the line. As described previously, the transfer of contacts R73–2 (Fig. 9*d*) will cause the energization of relay R90 and slow-to-operate relay R89. Furthermore, as described previously, the energization of relay R90 will begin a chain of operations to cause the secondary data order positions to be shifted one order to the left so that the data are arranged in the manner shown in Fig. 5*b*. The transfer of contacts R96–1 (see also Fig. 9*c*) through R96–6 consequent upon the energization of relay R96 in the manner aforedescribed, will cause the orders of data arranged in the positions shown in Fig. 6*b*, to be compared by the left shift compare circuits. Inasmuch as all of the positions shown in Fig. 6*b* have unequal data therein, none of the check relays R15 through R20 will be energized during this latter comparing operation. After slow-to-operate relay R89 (Fig. 9*d*) via contacts R73–2 is picked, a voltage applied to line 104 (Fig. 9*f*) will be directed through contacts R89–2, R73–1 and R18–1 n/c, relay R78LP, to the other side of the line. The transfer of contacts R78–2 (Fig. 9*d*) will cause the energization of relay R98 and slow-to-operate relay R97, and the energization of relay R98 will once again, as described previously in the cross-compare operation description, start a chain of operations which will cause the secondary data to be shifted two orders to the right. The transfer of contacts R104–1 through R104–6 shown in Fig. 9*c*, will cause the orders of data now arranged in the manner shown in Fig. 6*c*, to be compared by the right shift compare circuits shown in Fig. 9*c*. Hence, a voltage applied to line 104 (Fig. 9*f*) will be transmitted through contacts R97–7, R78–1, R65–1 n/o and R66–1 n/o, to equal output line 102, to thereby pass a left-offset primary and secondary data difference as an equal condition. As before, relay R111 is energized so that its associated contacts R111–1 (Fig. 9*d*) effect the energization of the latch trip coils shown therein, and contacts R111–2 (Fig. 9*f*) cause the deenergization of relay R86H.

As mentioned previously, the improvement in data comparators constituting the present invention, is not effective to reconcile all expressions of information falling within the afore-mentioned "human errors" categories, as matched expressions. For instance, the following illustrated left-offset error caused by omission of the character E in the name PESUPA, will not be passed notwithstanding that the second to fifth secondary positions are offset one position to the left with respect to the third to sixth primary positions:

PESUPA
PSUPA–

The present invention is effective to detect left-offset errors only if the symbol omitted in the secondary expression is one of a plurality of similar, adjacent symbols, such as the missing second "G" in the secondary expression HAGERTY of Fig. 6*a*. Inasmuch as it is a more natural and to be expected error to drop a single "G" from the name HAGGERTY, for instance, than to omit the "E" from PESUPA, the improvement afforded by this invention is a substantial one.

*Transposition-of-orders: Non-adjacent positions.*—Referring to Fig. 7*a*, it may be seen that the first, third, fifth and sixth positions are equal. As a result thereof, check relays R9 (Fig. 9*c*), R11, R13 and R14 are energized during the first comparison operation effected by the cross-compare circuits shown in Fig. 9*c*, after relay R87 (see also Fig. 9*f*) is picked as aforedescribed, so that a voltage applied from line 104 is transmitted through contacts R96–2, R88–1, R9–1 n/o, R10–1 n/c, R11–2 n/o, and R12–2 n/c, relay R72LP, to the other side of the line. The transfer of contacts R72–2 (Fig. 9*d*) will, as described previously, cause the energization of relay R90 and slow-to-operate relay R89, and the energization of relay R90 will, as described previously, start a chain of operations to cause the secondary data to be shifted one order to the left. Hence, after contacts R96–1 (Fig. 9*c*) through R96–6 transfer so as to complete left shift compare circuits whereby equal data indicating check relays are energized in conformity with the data shown in Fig. 7*b*. After contacts R89–2 (Fig. 9*f*) transfer, a voltage will be directed from line 104 through contacts R89–2, R72–1 R17–1 n/o, and R18–1 n/c, relay R78LP, to the other side of the line. It may be seen that check relay R17 will be energized during the left shift compare operation due to the equal orders of data in position 3 of Fig. 7*b*.

The transfer of contacts R78–2 (Fig. 9*d*) will cause the energization of relay R98 and slow-to-operate relay R97. The energization of relay R98 will start a chain of operations to cause the secondary data shown in Fig. 7*b* to be shifted two orders to the right so that this secondary data will be arranged in the manner shown in Fig. 7*c*. Thus, after contacts R104–1 (Fig. 9*c*) through R104–6 are transferred in order to energize respective check relays associated with equal data circuits, and after slow-to-operate relay R97 is picked, a voltage will be applied from line 104 (Fig. 9*f*) through contacts R97–7, R78–1, and R24–1 n/c, relay R83LP, to the other side of the line. It is to be observed that there is not a check relay energized during the right shift comparison of the data as arranged in Fig. 9*c* because there are no matched orders of data in the arrangement thereof.

The transfer of contacts R83–2 (Fig. 9*d*) will cause the energization of relay R106 and slow-to-operate relay R105, whereupon relay R106 will start a chain of operations to cause a shift of the secondary data one order to the right; i.e., the secondary data shown in Fig. 7*c* will be arranged in the manner shown in Fig. 7*a*. After contacts R107–1 (Fig. 9*c*) through R107–6 transfer so as to effect a comparison of the data shown in Fig. 7*a*, and after slow-to-operate relay contacts R105–2 (Fig. 9*f*) close, a voltage applied to line 104 will be directed through contacts R105–2, R83–1 and R12–3 n/c, to unequal output line 103, to thereby indicate that a transposition-of-orders data difference between non-adjacent orders, will be detected as unequal. As is shown in Fig. 9*f*, a parallel circuit is effective to energize relay R112 so that its associated contacts R112–1 (Fig. 9*d*) will close a circuit to energize the latch trip coils, and contacts R112–2 (Fig. 9*f*) will open the circuit to relay R86H.

*Summary*

To briefly summarize the operation of the preferred embodiment of the present invention, orders of primary record card data are entered into the code relay pick units 75 (Fig. 9*a*)–80, whereas secondary record card data orders are entered into similar and corresponding code relay pick units 81–86. As brought out previously, the record card data is stored in a special four relay code realized by the energization of select ones or more of four code relays within each data order position. If the secondary data expression as manifested by the operation of secondary data code relays within units 81–86, matches the primary data manifested by the code relays within units 75–80, the machine data compare apparatus as represented by units 55 (Fig. 1) and 56 will cause an equal data signal to be applied directly to the data compare control relays lock 57. In other words, the apparatus defined by the present invention and represented in Fig. 1 by block 50, would be by-passed should the primary and secondary expressions be equal. However, should the primary and secondary data expressions be unequal as determined by the data compare apparatus of the machine, a test signal would be directed to hub 101 (see also Fig. 9*f*).

The sequence of operations thereafter will be such that first a "cross-compare" operation will be effected by the cross-compare circuits shown in Fig. 9*c*. During this first cross-compare operation, wherever homologous orders of primary and secondary data are equal, corresponding check relays R9–R14 will be energized. After select ones of these check relays are energized, their associated contacts in the data compare circuits shown in Fig. 9*f* will be transferred so that a test impulse directed via contacts R88–1 will be directed to either energize one of the latch pick relays R70–R74, or to the equal line 102. Of course, should the impulse be directed to the equal line 102, this would simply mean that the primary and secondary data expressions determined to be unequal by the data compare apparatus as represented by units 55 (see also Fig. 1) and 56, are passed as equal expressions by the present invention.

On the other hand, should one of the latch pick relays R70–R74 be energized, the orders of secondary data will be shifted one position to the left by apparatus as represented by the left shift intermediate storage circuits shown in Fig. 9*e* and the code relay H2 hold circuits. After this left shift operation has been effected, the "left shift compare" circuits shown in Fig. 9*c* will be effective to compare the orders of data in this second relationship. Those order positions having equal data will effect the energization of corresponding check relays R15–R20 so that, once again, the data compare circuits shown in Fig. 9*f* will be effective to bring about either (*a*) the energization of one of the latch pick relays R75–R79, or (*b*) the application of an equal voltage signal on line 102. If one of the relays R75–R79 is picked, apparatus as represented by the right shift intermediate storage circuits shown in Fig. 9*e* will be rendered effective to cause a second shift of the secondary expression. During the second shift operation, the secondary data expression will be moved two positions to the right so that the orders of data will now actually stand in a position one order to the right with respect to the original position of the secondary data expression. Once this has been accomplished, a "right shift" comparison will be effected (see Fig. 9*c*), whereafter the data compare circuits shown in Fig. 9*f* will once again be effective to either (*a*) cause the energization of a latch pick relay R81–R85 or (*b*) cause a voltage signal to be directed to equal line 102.

Should one of the latter mentioned relays be energized, the secondary data expression will, once again and for the last time, be shifted one position to the left by apparatus as represented by the left shift intermediate storage apparatus and the code relay H2 hold circuits shown in Fig. 9*e*. In other words, the secondary data expression will be brought back to its original position. This having been done, a cross-compare operation (see Fig. 9*c*) will take place after which the data compare circuit shown in Fig. 9*f* will be effective to compare the orders of data brought back to their first relationship. A voltage signal will at this time be directed to either equal output line 102 or unequal output line 103. As stated previously, if the voltage signal is directed to equal output line 102, it simply means that the primary and secondary data expressions determined to be unequal by the data compare apparatus of the machine shown diagrammatically in Fig. 1, are determined by the present invention to have a predetermined relationship with one another so as to nevertheless be passed as equal data expressions. However, a voltage impulse along unequal line 103 means that the primary and secondary data expressions do not bear such a relationship as to be passed as equal data expressions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. A device of the class described for use with a collator having means for comparing two groups of data and producing equal or unequal signals in response thereto comprising first means for manifesting a first one of said groups of denominational orders of data, second means for manifesting a second one of said groups of denominational orders of data, means governed by said first and second means in response to one of said signals for correlating in a first homologous relationship respective orders of said first group and said second group, means controlled by the manifesting and comparing means for shifting the data in said second means so as to effect a correlation in another homologous relationship the orders of said first group and other orders of said second group, means governed by said data correlating means for comparing orders of data in said first homologous relationship so as to detect unmatched orders of data, and means controlled by said comparing means for terminating said first homologous relationship and rendering operative said shifting means in response to a predetermined number of unmatched first relationship orders of data.

2. A device of the class described for use in a collator having means for comparing first and second groups of data and producing an equal or unequal signal comprising first means for manifesting said first group of denominational orders of data; second means for manifesting said second group of denominational orders of data; means governed by said first and said second means for correlating in a first relationship orders of data of said first group and said second group; means for shifting the data of said second means one order in one direction so as to effect a correlation in a second relationship other orders of data in said first and said second groups, other means for shifting the data of said second means two orders in another direction from said shifted order so as to effect a correlation in a third relationship still other orders of data in said first and said second group; means individual to each of and governed by said correlating means for comparing orders of data so as to detect matched and unmatched orders thereof; and control means governed by each of said comparing means in response to a predetermined one of said signals for rendering operative said shifting means, to shift the data in said second means in said one direction in response to the detection of a predetermined number of unmatched first relationship orders of data, and in said another direction in response to the detection of a predetermined number of unmatched second relationship orders of data.

3. In a data comparator for a collator having means for sensing and comparing two groups of data and producing an equal or unequal signal in response thereto, the combination of first means for manifesting orders of primary data, second means for manifesting orders of secondary data, normally inoperative means governed by each of said data manifesting means for comparing orders of primary and secondary data arranged in a first relationship so as to detect first relationship orders of matched and unmatched data, means operatively connected to render said comparing means operative upon operation of the primary and secondary manifesting means, selectively operable means for shifting the orders of secondary data from a first relationship arrangement to a second relationship arrangement, and means controlled by said comparing means for effecting operation of said secondary data shifting means in response to said unequal signal upon the detection by said comparing means of a predetermined number of first relationship orders of unmatched data.

4. A data comparator for use in a collator having means for comparing two groups of signals and producing an equal or unequal signal comprising means for manifesting orders of primary data, means for manifesting orders of secondary data, means including normally inoperative first comparing means operable under the control of the first and second manifesting means and said unequal signal for comparing orders of primary and secondary data arranged in a first relationship so as to detect order positions thereof having matched and unmatched primary and secondary data, means including normally inoperative second comparing means operable under the control of the first and second manifesting means and said unequal pulse for comparing orders of primary and secondary data arranged in a second relationship so as to detect order positions thereof having matched and unmatched primary and secondary data, selectively operable secondary data shifting means for changing the arrangement of primary and secondary data from a first relationship to a second relationship, means operatively connected to render said first comparing means operative when the signal is unequal, means controlled by said first comparing means for rendering operative said secondary shifting means in response to the detection of a predetermined number of first relationship orders having unmatched data therein, and other means controlled by said first comparing means operatively connected for rendering said second comparing means operative and said first comparing means inoperative in response to the detection of a predetermined number of first relationship orders of unmatched data.

5. A data comparator according to claim 12 additionally comprising normally inoperative third means operable under the control of the primary and secondary manifesting means for comparing orders of primary and secondary data in a third relationship so as to detect order positions thereof having matched and unmatched primary and secondary data, other selectively operable secondary data shifting means for changing the arrangement of primary and secondary data from a second relationship to a third relationship, means controlled by said second comparing means for rendering operative said other shifting means in response to the detection of a predetermined number of second relationship orders of unmatched primary and secondary data, another means controlled by said second comparing means for rendering said third comparing means operative and said second comparing means inoperative in response to the detection of a predetermined number of second relationship orders of unmatched data, third selectively operable secondary data shifting means for changing the arrangement of primary and secondary data from a third relationship back to the first relationship, means controlled by said third comparing means for rendering operative said third secondary data shifting means in response to the detection of a predetermined number of third relationship orders having unmatched primary and secondary data therein, and other means controlled by said third comparing means for rendering said first comparing means operative for a second time and said third comparing means inoperative in response to the detection of a predetermined number of third relationship orders having unmatched data to provide an unequal data comparison signal in response to the detection of a single unmatched order by said first comparing means when rendered operative for the second time.

6. In a record card controlled machine having a primary record card data reading station, a secondary record card data reading station, means for feeding primary and secondary record cards past respective data reading stations, one-by-one, and comparing means for comparing primary and secondary card data and producing equal or unequal signals in response thereto, the combination of a data comparator comprising means operatively connected to said primary reading station for storing primary card data read at the primary station, means operatively connected to said secondary reading station for storing secondary card data read at the secondary station, normally inoperative means governed by said primary and said secondary data storing means in response to an unequal signal from said comparing means for comparing orders of stored primary and secondary data arranged in a first relationship so as to detect first relationship orders of matched and unmatched data, means for rendering said comparing means operative, selectively operable means controlled by the primary and secondary data storing means for shifting the orders of secondary data from a first relationship arrangement to a second relationship arrangement, and means controlled by said comparing means in response to said unequal signal for rendering operative said shifting means in response to the detection of a predetermined number of first relationship orders having unmatched primary and secondary data therein.

7. In a device of the class described for use in a collator having comparing means for comparing correlated order positions of primary and secondary data expressions and producing equal or unequal signals; primary and secondary data manifesting means; an input line; an equal expression output line; an unequal expression output line; an electric circuit network including three electric channels, the first and third channels each adapted to be interposed between said input line and said equal output line, and the second channel adapted to be interposed between said input line and said unequal output line; normally inoperative first means governed by said data manifesting means for comparing order positions of data correlated in a first relationship to thereby detect positions having matched and unmatched data therein; normally inoperative second means governed by said data manifesting means for comparing order positions of data correlated in a second relationship to thereby detect positions having matched and unmatched data therein; means controlled by the manifesting means for rendering said first comparing means operative; means controlled by said first comparing means operable to define said first channel in response to the detection thereby of less than a predetermined number of unmatched positions of data; other means including certain of said data manifesting means and means controlled by said first comparing means for rendering said second comparing means operative, and for rendering said first comparing means inoperative in response to the detection of a predetermined number of unmatched positions of data; means controlled by said second comparing means for defining said second channel consequent upon the detection of a predetermined number of unmatched data correlated in said second relationship whereby unequal data expressions are signified, and for defining said third channel consequent upon the detection of less than a predetermined number of unmatched positions of data whereby equal data expressions are signified.

No references cited.

UNITED STATES PATENT OFFICE

CERTIFICATE OF CORRECTION

Patent No. 2,979,257 April 11, 1961

Julius Jancin, Jr.

It is hereby certified that error appears in the above numbered patent requiring correction and that the said Letters Patent should read as corrected below.

Column 16, line 18, for the claim reference numeral "12" read -- 4 --.

Signed and sealed this 28th day of November 1961.

(SEAL)

Attest:

ERNEST W. SWIDER

Attesting Officer

DAVID L. LADD

Commissioner of Patents

USCOMM-DC